US012619498B2

(12) United States Patent
Hamo et al.

(10) Patent No.: US 12,619,498 B2
(45) Date of Patent: May 5, 2026

(54) DATA STORAGE DEVICE AND METHOD FOR TRANSACTION RECOVERY USING EXTRA TIMEOUT

(71) Applicant: Sandisk Technologies, Inc., Milpitas, CA (US)

(72) Inventors: Eyal Hamo, Naharia (IL); Sagi Taragan, Ramat Ishay (IL); Michael Edry, Haifa (IL)

(73) Assignee: Sandisk Technologies, Inc., Milpitas, CA (US)

( * ) Notice: Subject to any disclaimer, the term of this patent is extended or adjusted under 35 U.S.C. 154(b) by 9 days.

(21) Appl. No.: 18/676,886

(22) Filed: May 29, 2024

(65) Prior Publication Data

US 2025/0370875 A1    Dec. 4, 2025

(51) Int. Cl.
*G06F 3/00*        (2006.01)
*G06F 11/14*       (2006.01)

(52) U.S. Cl.
CPC .... *G06F 11/1415* (2013.01); *G06F 2201/805* (2013.01)

(58) Field of Classification Search
None
See application file for complete search history.

(56) References Cited

U.S. PATENT DOCUMENTS

| | | | | |
|---|---|---|---|---|
| 9,697,152 B1 * | 7/2017 | Riedy | .................. | G06F 13/122 |
| 10,958,702 B1 * | 3/2021 | Yang | ..................... | H04L 65/752 |
| 11,409,468 B2 | 8/2022 | Muthiah | | |
| 11,805,067 B1 * | 10/2023 | Balasubramanian | ... | H04L 47/60 |
| 2005/0216664 A1 | 9/2005 | Taninaka et al. | | |
| 2012/0005404 A1 | 1/2012 | Raz et al. | | |
| 2014/0068725 A1 * | 3/2014 | Zhang | .................. | H04W 12/06 |
| | | | | 726/5 |
| 2017/0322726 A1 | 11/2017 | Walker et al. | | |
| 2019/0079676 A1 | 3/2019 | Seo et al. | | |
| 2019/0089383 A1 * | 3/2019 | Funaoka | ............. | G06F 11/1048 |
| 2019/0384528 A1 * | 12/2019 | Grosz | .................. | G06F 3/0611 |
| 2020/0371578 A1 * | 11/2020 | Murali | .................. | G06F 1/3228 |
| 2023/0239380 A1 * | 7/2023 | Crowder | ................ | H04L 69/22 |
| | | | | 713/500 |
| 2024/0264936 A1 * | 8/2024 | Kragel | ................ | G06F 12/0253 |

* cited by examiner

*Primary Examiner* — Henry Tsai
*Assistant Examiner* — Dean Phan
(74) *Attorney, Agent, or Firm* — Crowell & Moring LLP

(57)            ABSTRACT

A data storage device and method are disclosed for transaction recovery using extra timeout. In one embodiment, a data storage device is provided comprising a memory and one or more processors. The one or more processors, individually or in combination, are configured to: receive a command from a host, wherein the command is associated with a timeout window; begin processing the command; and after beginning processing the command but prior to expiration of the timeout window: determine that the command will not be completed prior to expiration of the timeout window; and send a request to the host for an extension of the timeout window. Other embodiments are provided.

19 Claims, 6 Drawing Sheets

DATA STORAGE DEVICE AND METHOD FOR TRANSACTION RECOVERY USING EXTRA TIMEOUT

BACKGROUND

A host can send read and write requests to a data storage device to read data from and store data in a memory of the data storage device. A specification under which the data storage device and host operate can specify a time period for the data storage device to complete a command sent by the host. If the command is not executed within that time period, the data storage device can be considered to have timed-out.

DETAILED DESCRIPTION

Figures 1A, 1B, 1C:
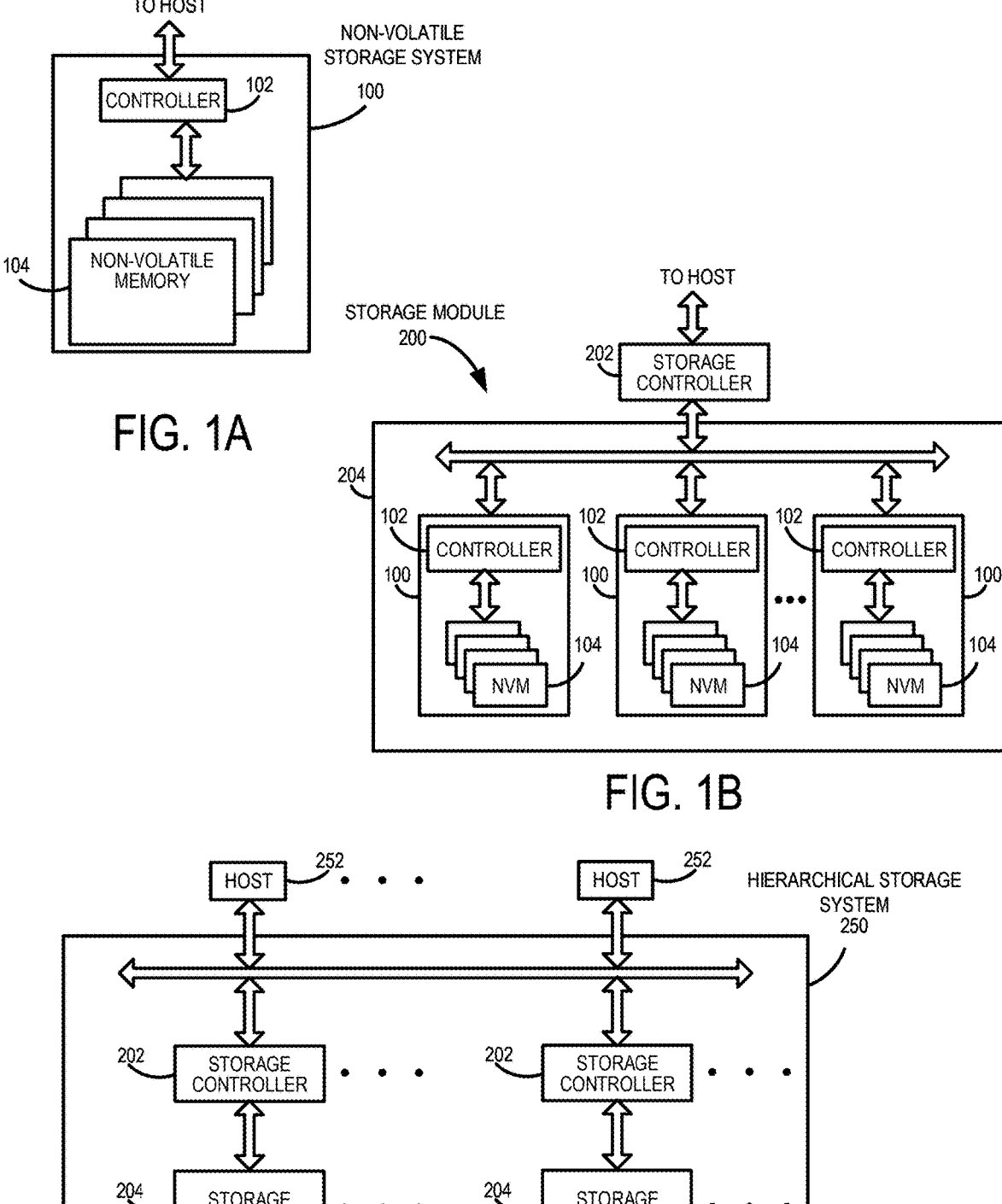
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for transaction recovery using extra timeout. In one embodiment, a data storage device is provided comprising a memory and one or more processors. The one or more processors, individually or in combination, are configured to: receive a command from a host, wherein the command is associated with a timeout window; begin processing the command; and after beginning processing the command but prior to expiration of the timeout window: determine that the command will not be completed prior to expiration of the timeout window; and send a request to the host for an extension of the timeout window.

In some embodiments, the one or more processors, individually or in combination, are further configured to: receive an acknowledgment from the host that the request has been granted.

In some embodiments, the one or more processors, individually or in combination, are further configured to: receive a command from the host to reset the data storage device in response to the request not being granted.

In some embodiments, the request specifies an amount of time for the extension.

In some embodiments, the host determines an amount of time for the extension.

In some embodiments, information about the timeout window is provided to the data storage device by the host.

In some embodiments, the one or more processors, individually or in combination, are further configured to: continue processing the command irrespective of whether a response to the request was received by the host.

In some embodiments, the one or more processors, individually or in combination, are further configured to: perform a data-storage-device-initiated reset prior to expiration of the extension of the timeout window.

In some embodiments, the command will not be completed prior to expiration of the timeout window due to a high volume of commands.

In some embodiments, the command will not be completed prior to expiration of the timeout window due to a lack of available memory.

In some embodiments, the data storage device begins processing the command without performing a handshake with the host to confirm that processing of the command should begin.

In some embodiments, the data storage device begins processing the command without first determining that the command will be able to be completed prior to expiration of the timeout window.

In some embodiments, the memory comprises a three-dimensional memory.

In another embodiment, a method is provided that is performed in a data storage device comprising a memory. The method comprises: after beginning processing a command received a host, determining whether that the command will be completed prior to expiration of a predetermined period of time; in response to determining that the command will not be completed prior to expiration of the predetermined period of time, sending a request to the host to add additional time to the predetermined period of time; and without waiting for a response to the request from the host, continuing to process the command.

In some embodiments, the request is sent by raising an exception bit on a communication line with the host.

In some embodiments, the request is sent by toggling a communication line with the host.

In some embodiments, information about the predetermined period of time is provided to the data storage device by the host.

In some embodiments, the command will not be completed prior to expiration of the predetermined period of time due to a high volume of commands.

In some embodiments, the command will not be completed prior to expiration of the predetermined period of time due to a lack of available memory.

In another embodiment, a data storage device is provided comprising: a memory; and means for requesting additional time to complete a command in response to determining, during execution of the command, that the command cannot be completed prior to a host timeout window.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
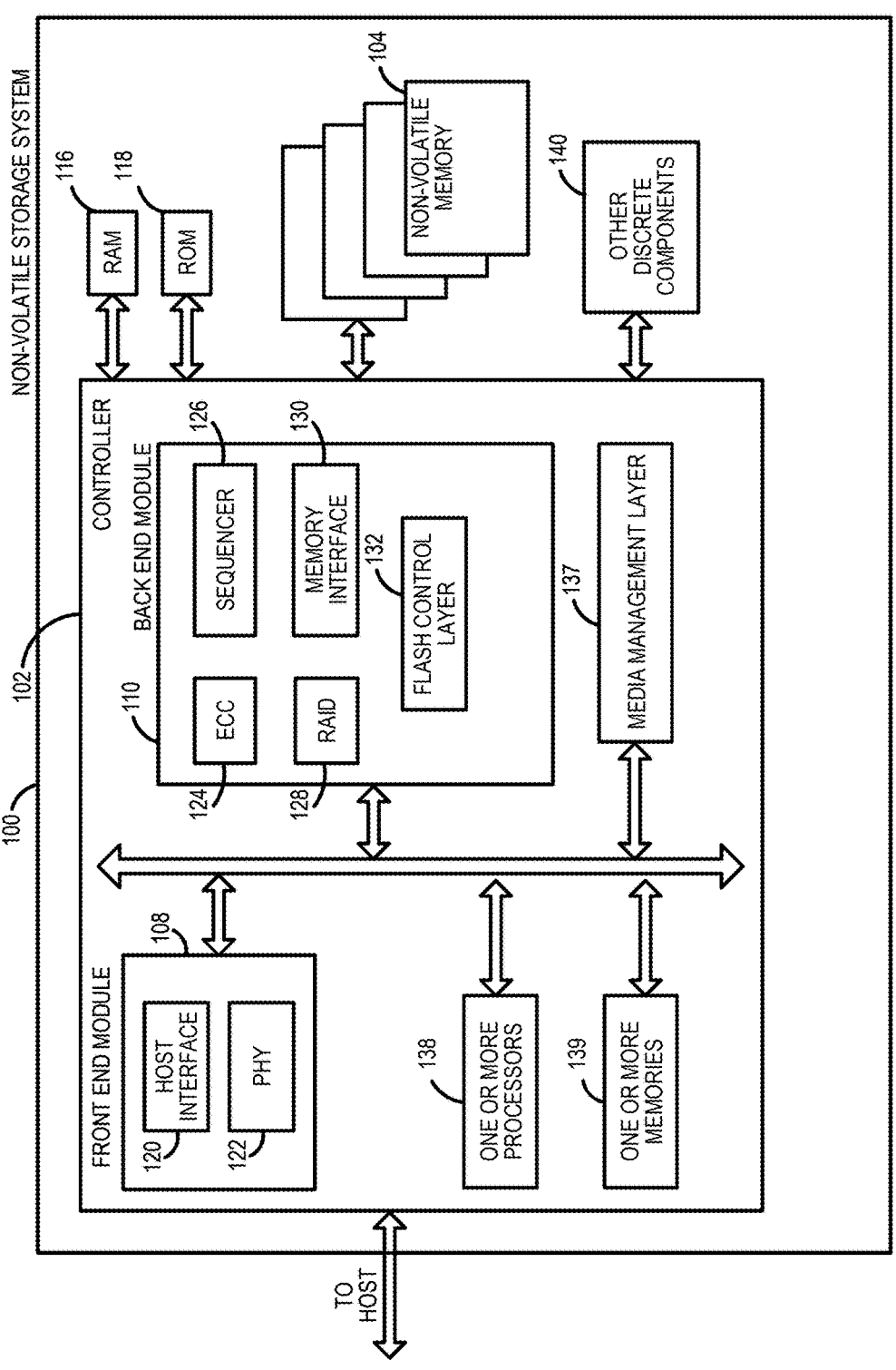
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
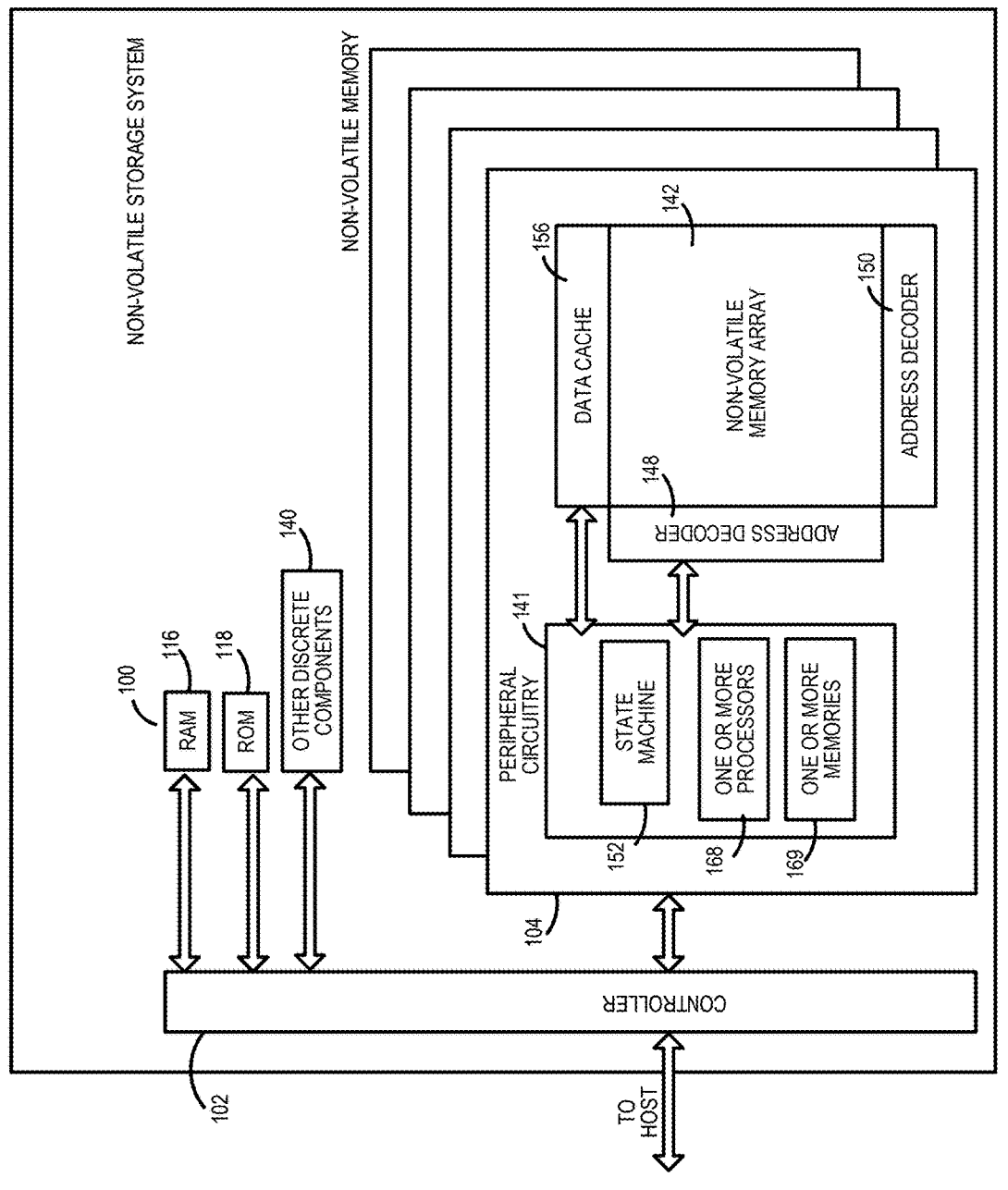
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
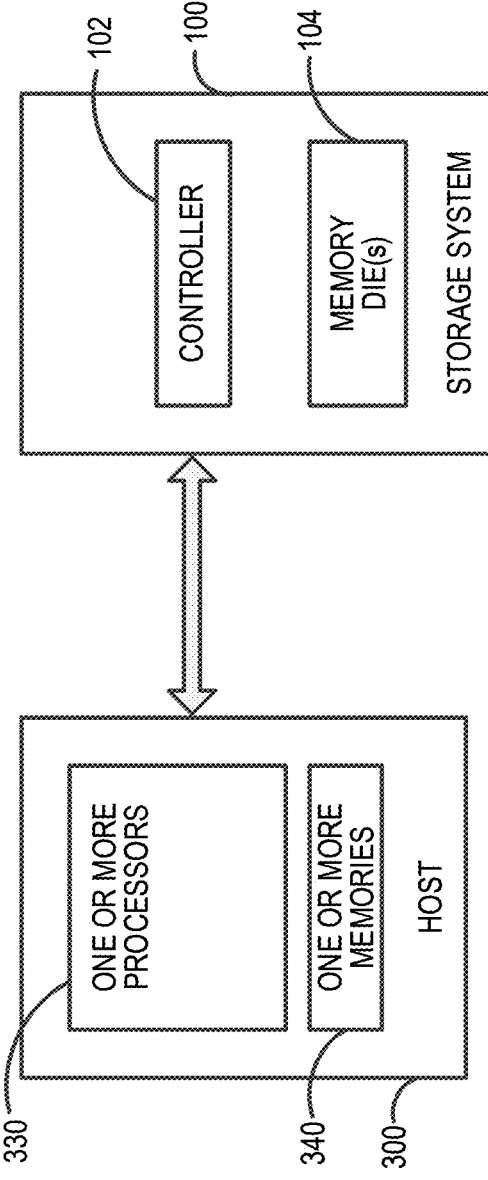
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

A specification under which a data storage device and a host operate can specify various operating conditions and parameters. For example, the Universal Flash Storage (UFS) specification defines an initialization process to be performed by a data storage device after being powered-up by a host. After the initialization process is completed, the data storage device is in active mode and can receive transactions (e.g., a set of operations/commands, such as read and/or write commands) from the host. In additional to powering-on the data storage device, the host can power-off the data storage device (e.g., to reduce the power consumption). The host can also reset the data storage device by powering-off the data storage device and then powering-on the data storage device, which triggers performance of the initialization process.

As mentioned above, the specification under which the data storage device and host operate can also specify a time period for the data storage device to complete a command sent by the host. If the command is not executed within the time period (e.g., if the host does not receive a response from the data storage device within the time period), the data storage device can be considered to have timed-out. There can be several reasons why the data storage device cannot execute a command within the timeout period. For example, the data storage device may not be able to respond to a host command by the expiration of the timeout window if the controller of the data storage device gets overloaded by other tasks/commands (e.g., in a heavy host workload environment). As another example, the controller of the data storage device can "get stuck" by an internal corner case that causes commands/operations not to be performed (e.g., because the memory is full (does not have free blocks) or fragmented).

When the host sends a command to the data storage device and does not receive a response to that command by the expiration of the timeout window, the host can reset the data storage device and re-send the command. However, an ungraceful reset or frequent resetting of the data storage device can affect the user experience and quality of service, possibly leading to the user returning the data storage device or exposing memory defects. Further, resetting the data storage device can use host resources that can be otherwise used for other tasks.

To address these issues, the following embodiments provide a mechanism for the controller 102 of the data storage device 100 to inform the host 300, after starting to process a command, that the command will not be completed by the expiration of the timeout window. The host 300 can then extend the timeout window to give the controller 102 of the data storage device 100 more time to complete the command, which avoids the need to reset the data storage device 100. The amount of time that the timeout window is extended can be requested by the controller 102 of the data storage device 100, can be determined by the host 300, or can be a predetermined amount of time. This extra time gives the controller 102 of the data storage device 100 time to resolve whatever issue is causing the delay. For example, if the delay is caused by the controller 102 of the data storage device 100 being overloaded by other tasks/commands, the extension gives the controller 102 extra time to work through the backlog. If the delay is caused by the controller 102 being "stuck" by some internal corner case (e.g., the memory 104 being full or fragmented), the extension gives the controller 102 time to perform an internal reset (i.e., not triggered by the host 300) without loss of physical communication to the host 300.

Figure 4:
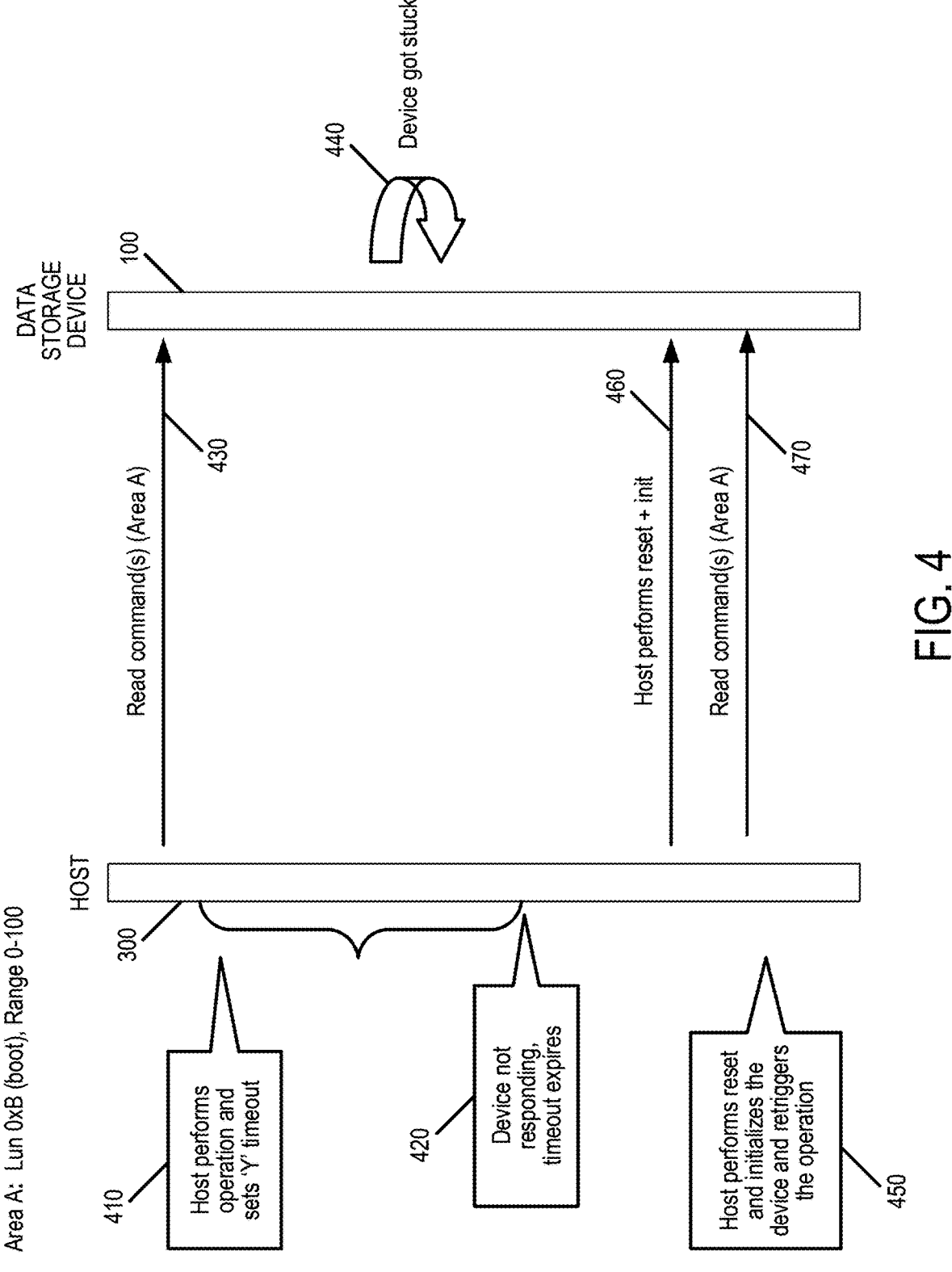
FIG. 4 is a flow diagram illustrating a timeout problem.
Figure 5:
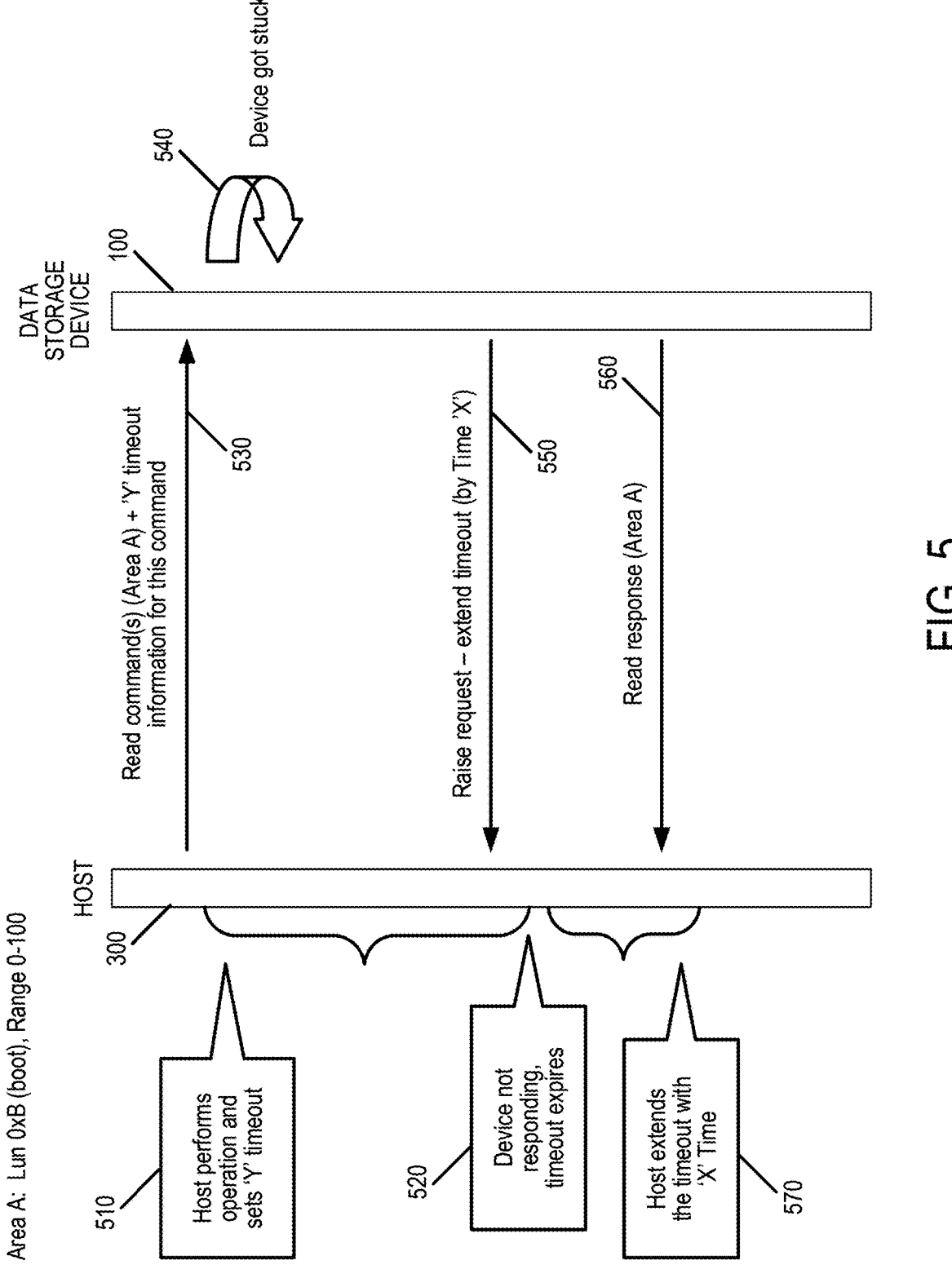
FIG. 5 is a flow diagram of a method of an embodiment for transaction recovery using extra timeout.

FIG. 4 illustrates the timeout problem, and FIG. 5 shows how this embodiment can overcome it. In the example shown in FIG. 4, the specification under which the host 300 operates specifies a timeout window of Y units of time (410). So, if the data storage device 100 does not respond to the command by the expiration of the timeout window (420), the host 300 will reset and re-initialize the data storage device 100 and re-send the command (450). In this example, the host 300 sends a read command to the data storage device 100 (430), and the controller 102 of the data storage device 100 "gets stuck" (440) and cannot respond to the host 300 by the expiration of the timeout window. So, the host 300 resets the data storage device 100 (460) and re-sends the read command (470).

FIG. 5 illustrates how these embodiments can be used to avoid the quality-of-service impact caused by a host reset. In this example, a dynamic timeout system is used per command, as supported by the host. In this example, as in the example shown in FIG. 4, the specification under which the host 300 operates specifies a timeout window of Y units of time (510). So, if the data storage device 100 does not respond to the command by the expiration of the timeout window (520), the host 300 can reset and re-initialize the data storage device 100 and re-send the command. However, in this example, when the host 300 sends the command to the data storage device 100, the host 300 also informs the data storage device 100 of the timeout window associated with the command (530). In other embodiments, the data storage device 100 is already aware of the timeout window (e.g., through an earlier communication from the host 300, from a factory configuration, etc.), so the host 300 does not need to provide the timeout window information along with the command. That is, the timeout information can be sent either along with the command or separately (e.g., by providing a table that contains information on all commands versus their respective timeout values). In yet another embodiment, the timeout information is not provided to the data storage device 100 until needed (e.g., when the data storage device 100 realizes that it is "stuck," after more than a threshold number of commands are pending, etc.).

At some point after receiving and starting execution of the command, the controller 102 of the data storage device 100 realizes that it will not be able to respond to the host 300 by the expiration of the timeout window (e.g., because the controller 102 is "stuck") (540). For example, the data storage device 100 can utilize the timeout information provided by the host 300 and calculate whether a command will be completed within the designated time. If the command will not be completed in time, the controller 102 of the data storage device 100 can send, prior to the expiration of the timeout window, a request to the host 300 to extend the timeout window (550). This request can take any suitable form. For example, the controller 102 of the data storage device 100 can raise an exception bit or toggle a communication line to the host 300. Also, in some embodiments, the controller 102 of the data storage device 100 can calculate a specific amount of time (e.g., X time units) needed to complete the command and request that the host 300 extend the timeout window by that specific amount of time. In another embodiment, the extension-of-time request contains a preset amount of time, and multiple requests of that preset amount of time can be sent to the host 300, if needed. In yet another embodiment, the extension-of-time request does not request a specific amount of time, and the host 300 determines how much time to extend the timeout window (e.g., by doing a calculation or using a pre-set amount of time).

In response to receiving the extension-of-time request from the data storage device 100, the host 300 can extend the timeout window to provide time for the data storage device 100 to complete the command and send a response (560). The host 300 can provide an indication to the data storage device 100 that the request has been granted, or the data storage device 100 can just assume, without such indication, that the request has/will be granted. The host 300 can automatically grant the request or can determine whether or not the extension-of-time request should be granted (e.g., based on workload or other factors). If the host 300 does not grant the extension-of-time request, the host 300 can re-set the data storage device 100 at the end of the timeout window, as discussed above.

In summary, these embodiments provide a recovery timeout transaction between the data storage device 100 and host 300 that warns the host 300 of a stuck command/operation and requests extra time from the host 300 to finish the command/operation. This extra time can allow the controller 102 of the data storage device 100 to perform an internal reset without requiring action by the host 300 and without resulting in a loss of physical communication with the host 300, which can occur with a host-initiated reset.

There are several advantages associated with these embodiments. For example, allowing the data storage device 100 to extend the timeout window can avoid the need for the host 300 to reset and re-send a command to the data storage device 100, which can improve the user experience and quality of service. The embodiments can also be helpful in qualifying new data storage devices for learning the behavior of how such devices are handling commands, in optimizing debugging operations by analyzing information that is exposed in timeout situations, and in reducing the need for a user to return the data storage device. Further, using a dynamic timeout window defined by the host 300 can avoid an ungraceful reset.

Also, as noted above, in these embodiments, the data storage device 100 sends the extension-of-time request after—not before—beginning execution of a host command. This provides advantages over other data storage devices that send an extension-of-time request before beginning execution of a host command. For example, sending the request after starting the command avoids the delay in starting the processing of the command and the delay associated with a handshake between the data storage device and the host. That is, in one embodiment, the data storage device can start and continue processing a command without first sending a request and waiting for confirmation from the host. In this way, the request can be considered an "alarm" sent to the host after the command starts as a recommendation for more time to complete the command rather than a request for an agreement on timing prior to the commencement of the command. This difference highlights a difference in operating principle. These embodiments can be used as an alternative to a host-initiated reset when the data storage device "gets stuck" or cannot otherwise complete a command in time. In contrast, data storage devices that send a request prior to starting a command may not be able to recognize a "stuck" situation or calculate a time needed to resolve the problem. Further, the such prior data storage devices need information about the timeout window prior to starting a command, as such information is needed to determine if the data storage device will be able to finish the command on time. In contrast, such information is not required in these embodiments, as the data storage device can simply start the command and request extra time if and when needed. That is, the data storage device of these embodiments does not need the foresight regarding potential instances that can lead to host command timeout. In contrast, some prior data storage devices need such information prior to starting the execution of a command.

In summary, the underlying assumptions in those prior data storage devices are that the data storage device can, before the command starts, calculate how much time is needed to perform the command, so the extension-of-time request can be sent before the command starts and further that a timeout needs to be avoided. In contrast, with these embodiments, delays that can cause a timeout may not be known in advance, so the data storage device may not be able to calculate how much time is needed to perform the command before the command starts (e.g., because the data storage device may not know that it will "get stuck"). Also, with these embodiments, while a host-initiated reset may not be not desirable, it still may be considered an acceptable recovery option.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
      receive a command from a host, wherein the command is associated with a timeout window;
      begin processing the command; and
      after beginning processing the command but prior to expiration of the timeout window:
         determine that the command will not be completed prior to expiration of the timeout window;
         send a request to the host for an extension of the timeout window; and
         perform a data-storage-device-initiated reset prior to expiration of the extension of the timeout window.

2. The data storage device of claim 1, wherein the one or more processors, individually or in combination, are further configured to:
   receive an acknowledgment from the host that the request has been granted.

3. The data storage device of claim 1, wherein the one or more processors, individually or in combination, are further configured to:
   receive a command from the host to reset the data storage device in response to the request not being granted.

4. The data storage device of claim 1, wherein the request sent to the host specifies an amount of time for the extension.

5. The data storage device of claim 1, wherein the host determines an amount of time for the extension.

6. The data storage device of claim 1, wherein information about the timeout window is provided to the data storage device by the host.

7. The data storage device of claim 1, wherein the one or more processors, individually or in combination, are further configured to:
   continue processing the command irrespective of whether a response to the request was received by the host.

8. The data storage device of claim 1, wherein the command will not be completed prior to expiration of the timeout window due to a high volume of commands or an internal background operation task that overloads the data storage device and prevents the command from being completed prior to expiration of the timeout window.

9. The data storage device of claim 1, wherein the command will not be completed prior to expiration of the timeout window due a lack of available memory that leads to the controller freeing more space in the memory by relocating data.

10. The data storage device of claim 1, wherein the data storage device begins processing the command without performing a handshake with the host to confirm that processing of the command should begin.

11. The data storage device of claim 1, wherein the data storage device begins processing the command without first determining that the command will be able to be completed prior to expiration of the timeout window.

12. The data storage device of claim 1, wherein the memory comprises a three-dimensional memory.

13. A method comprising:

performing in a data storage device comprising a memory:

receiving a command from a host, wherein the command is to be completed prior to an expiration of a predetermined period of time;

beginning processing the command without knowing whether the command will be completed prior to the expiration of the predetermined period of time;

after beginning processing the command, determining that the command will not be completed prior to the expiration of the predetermined period of time due to a delay caused by an issue internal to the data storage device that was unknown before beginning processing the command;

in response to determining that the command will not be completed prior to the expiration of the predetermined period of time, sending a request to the host to add additional time to the predetermined period of time, wherein the additional time is to resolve the issue internal to the data storage device that is causing the delay; and without waiting for a response to the request from the host, continuing to process the command.

14. The method of claim 13, wherein the request is sent by raising an exception bit on a communication line with the host.

15. The method of claim 13, wherein the request is sent by toggling a communication line with the host.

16. The method of claim 13, wherein information about the predetermined period of time is provided to the data storage device by the host.

17. The method of claim 13, wherein the command will not be completed prior to expiration of the predetermined period of time due to a high volume of commands or an internal background operation task that overloads the data storage device and prevents the command from being completed prior to expiration of the predetermined period of time.

18. The method of claim 13, wherein the command will not be completed prior to expiration of the predetermined period of time due to a lack of available memory that leads to the data storage device freeing more space in the memory by relocating data.

19. A data storage device comprising:

a memory; and means for:

receiving a command from a host, wherein the command is to be completed prior to an expiration of a predetermined period of time;

beginning processing the command without knowing whether the command will be completed prior to the expiration of the predetermined period of time;

after beginning processing the command, determining that the command will not be completed prior to the expiration of the predetermined period of time due to a delay caused by an issue internal to the data storage device that was unknown before beginning processing the command;

in response to determining that the command will not be completed prior to the expiration of the predetermined period of time, sending a request to the host to add additional time to the predetermined period of time, wherein the additional time is to resolve the issue internal to the data storage device that is causing the delay; and without waiting for a response to the request from the host, continuing to process the command.

\* \* \* \* \*